United States Patent [19]
Jingu et al.

[11] Patent Number: 6,129,070
[45] Date of Patent: Oct. 10, 2000

[54] PISTON FOR CYLINDER DIRECT INJECTION SPARK IGNITION INTERNAL COMBUSTION ENGINE

[75] Inventors: Nobuhisa Jingu, Kanagawa; Mitsuhiro Akagi, Yokohama, both of Japan

[73] Assignee: Nissan Motor Co., Ltd., Yokohama, Japan

[21] Appl. No.: 09/155,314

[22] PCT Filed: May 25, 1998

[86] PCT No.: PCT/JP98/02271

§ 371 Date: Sep. 25, 1998

§ 102(e) Date: Sep. 25, 1998

[87] PCT Pub. No.: WO98/55743

PCT Pub. Date: Dec. 10, 1998

[30] Foreign Application Priority Data

| | | | |
|---|---|---|---|
| Jun. 3, 1997 | [JP] | Japan | 9-144926 |
| Dec. 18, 1997 | [JP] | Japan | 9-348763 |
| Dec. 18, 1997 | [JP] | Japan | 9-348764 |

[51] Int. Cl.$^7$ .................................. F02F 3/24; F02B 3/08
[52] U.S. Cl. ........................ 123/298; 123/276; 123/305
[58] Field of Search ..................... 123/276, 295, 123/298, 301, 305

[56] References Cited

U.S. PATENT DOCUMENTS

| | | | |
|---|---|---|---|
| 4,920,937 | 5/1990 | Sasaki et al. | 123/298 |
| 5,127,379 | 7/1992 | Kobayashi et al. | 123/305 |
| 5,720,253 | 2/1998 | Matoba et al. | 123/305 |
| 5,727,520 | 3/1998 | Wirth et al. | 123/305 |
| 5,816,215 | 10/1998 | Yoshikawa et al. | 123/305 |
| 5,921,215 | 7/1999 | Wirth et al. | 123/298 |

FOREIGN PATENT DOCUMENTS

| | | |
|---|---|---|
| 464622 | 1/1992 | European Pat. Off. . |
| 558072 | 9/1993 | European Pat. Off. . |
| 5-240044 | 9/1993 | Japan . |
| 8-312354 | 11/1996 | Japan . |
| 9-144543 | 6/1997 | Japan . |

*Primary Examiner*—Willis R. Wolfe
*Attorney, Agent, or Firm*—Foley & Lardner

[57] ABSTRACT

A piston for a cylinder direct injection spark ignition internal combustion engine mounted on an automotive vehicle. The piston comprises a piston head including a protruded section which is protruded from a standard horizontal plane which is perpendicular to a center axis of the piston. The protruded section has a cavity whose periphery forms a generally circular ridgeline, and an inclined surface formed outside the ridgeline and extending toward a periphery of the piston head. The inclined surface continuously slopes down in a direction from the ridgeline to the periphery of the piston. The inclined surface forms an angle ($\theta_1$) ranging from 10 to 60° relative to the standard horizontal plane. The cavity has a depth (A) within a range of from 3 to 9 mm which depth is an axial distance between a bottom surface of the cavity and the standard horizontal plane of the piston. Additionally, the cavity is defined by a generally annular side wall surface which is represented by first and second opposite curved line segments on a vertical plane containing a center axis of the piston and a center axis of the cavity. The first curved line segment is located closer to a spark plug than the second curved line segment. The first curved line segment has a radius of curvature, ranging from 5 to 20 mm.

18 Claims, 10 Drawing Sheets

PISTON FOR CYLINDER DIRECT INJECTION SPARK IGNITION INTERNAL COMBUSTION ENGINE

TECHNICAL FIELD

This invention relates to improvements in a cylinder direct injection spark ignition internal combustion engine, and more particularly to improvements in shape of a piston head of a piston used in the engine for the purpose of making compatible effective stratified charge combustion and effective homogeneous charge combustion with each other.

BACKGROUND ART

Conventional pistons of cylinder direct injection spark ignition internal combustion engines have a protruded piston head which is formed with a cavity or depression forming part of a combustion chamber, as disclosed, for example, in Japanese Patent Provisional Publication No. 8-312354. The cavity has a generally circular peripheral portion which is edge-like to form a ridgeline. The cavity is formed offset relative to the center axis of the cylinder toward an intake valve. Fuel is injected toward the cavity from a fuel injector valve in compression stroke so as to concentrically form a fuel-rich layer of stratified charge around a spark plug, thereby accomplishing stratified charge combustion. Otherwise, fuel is injected in intake stroke in accordance with an engine operating condition so as to spread the fuel in the whole combustion chamber. This forms homogeneous charge in the combustion chamber thereby accomplishing homogeneous charge combustion.

However, the above conventional piston is formed at its piston head with flat wall surfaces which are located outside the ridgeline and on the right and left sides of the cavity so as to extend parallel with an imaginary vertical plane passing through axes of a plurality of cylinders each of which is provided with the piston. Inclined wall surfaces are formed on the opposite sides of each flat wall surface so as to slope down toward the periphery of the piston head. The flat wall surfaces are positioned to traverse the combustion chamber and near the top portion of the protruded piston head. Consequently, these flat wall surfaces are deemed serving as a projected wall lying between the inside and outside of the cavity, thereby degrading combustion performance when homogeneous charge combustion is made upon fuel injection in intake stroke.

More specifically, the projected wall prevents flow of sprayed fuel from flowing between the inside and outside of the cavity. Accordingly, the sprayed fuel unavoidably tends to stay inside the cavity so that air-fuel mixture resides locally, thus preventing formation of homogeneous air-fuel mixture or charge. Additionally, the sprayed fuel is prevented from its vaporization thus making insufficient homogenization of air-fuel mixture within the combustion chamber. Furthermore, the projected wall makes the inside and outside of the cavity discontinuous, and therefore effective combustion cannot be obtained at the outside of the cavity thus degrading homogeneous charge combustion performance.

Furthermore, under the present status, the inclination angle and the like of the inclined wall surfaces have not yet been set at optimum ranges from the viewpoints of improving homogeneous charge combustion while preventing combustion performance degradation under the effect of the cavity.

DISCLOSURE OF INVENTION

It is an object of the present invention to provide an improved piston for a cylinder direct injection spark ignition internal combustion engine which can effectively overcome drawbacks encountered in conventional pistons for cylinder direct injection spark ignition internal combustion engines.

Another object of the present invention is to provide an improved piston for a cylinder direct injection spark ignition internal combustion engine, which can improve homogeneous charge combustion performance of the engine without degrading stratified charge combustion performance of the engine due to a cavity formed at the piston head.

A further object of the present invention is to provide an improved piston for a cylinder direct injection spark ignition internal combustion engine, in which the shape of the piston head of the piston is optimized to make compatible both homogeneous charge combustion and stratified charge combustion in a combustion chamber of the engine.

An aspect of the present invention resides in a piston for a cylinder direct injection spark ignition internal combustion engine. The piston comprises a piston head including a protruded section which is protruded from a standard horizontal plane which is perpendicular to a center axis of the piston. The protruded section has a cavity whose periphery forms a generally circular ridgeline, and an inclined surface formed outside the ridgeline and extending toward a periphery of the piston head. The inclined surface continuously slopes down in a direction from the ridgeline to the periphery of the piston head. The inclined surface forms an angle ($\theta 1$) ranging from 10 to 60° relative to the standard horizontal plane.

Another aspect of the present invention resides in a piston for a cylinder direct injection spark ignition internal combustion engine. The piston comprises a piston head including a protruded section which is protruded from a standard horizontal plane which is perpendicular to a center axis of the piston. The protruded section has a cavity whose periphery forms a generally circular ridgeline, and an inclined surface formed outside the ridgeline and extending toward a periphery of the piston head. The inclined surface continuously slopes down in a direction from the ridgeline to the periphery of the piston. The inclined surface forms an angle ($\theta 1$) ranging from 10 to 60° relative to the standard horizontal plane. The cavity has a depth (A) within a range of from 3 to 9 mm which depth is an axial distance between a bottom surface of the cavity and the standard horizontal plane of the piston. Additionally, the cavity is defined by a generally annular side wall surface which is represented by first and second opposite curved line segments on a vertical plane containing a center axis of the piston and a center axis of the cavity. The first curved line segment is located closer to a spark plug than the second curved line segment. The first curved line segment has a radius of curvature, ranging from 5 to 20 mm.

A further aspect of the present invention resides in a cylinder direct injection spark ignition internal combustion engine which comprises a cylinder block having a plurality of cylinders. A cylinder head is fixedly mounted on the cylinder block. Intake and exhaust valves are movably disposed to the cylinder head. A fuel injector valve is provided to directly inject fuel into a combustion chamber formed corresponding to each cylinder. A spark plug is provided such that its tip end section is projected into the combustion chamber. A piston is movably disposed in the cylinder to define the combustion chamber between it and the cylinder head. The piston includes a piston head having a protruded section which is protruded from a standard horizontal plane which is perpendicular to a center axis of the piston. The protruded section has a cavity whose periphery forms a generally circular ridgeline. The cavity has a center axis which is offset from a center axis of the piston toward the intake valve, and an inclined surface formed outside the ridgeline and extending toward a periphery of the piston head. The inclined surface continuously slopes down in a direction from the ridgeline to the periphery of the piston. The inclined surface forms an angle ranging from 10 to 60° relative to the standard horizontal plane.

According to the present invention, no flat surfaces are formed outside the ridgeline surrounding the cavity at the piston head so that the inclined surface continuously slopes down from the top portion toward the periphery portion of the piston head. Additionally, the inclination angle of the inclined surface relative to the horizontal plane perpendicular to the center axis of the piston is optimized within the range of from 10 to 60°. As a result, effective stratified charge combustion is accomplished under the effect of the cavity. Furthermore, during homogeneous charge combustion, effective gas flow between the inside and outside of the cavity can be ensured, thereby effectively promoting homogenization of air-fuel mixture while reducing the surface area of the piston so as to lower cooling loss of the engine.

BEST MODE FOR CARRYING OUT THE INVENTION

Referring now to FIGS. 1 to 4 of the drawings, an embodiment of a piston of a cylinder direct injection spark ignition internal combustion engine, according to the present invention is illustrated by the reference numeral 1. The engine is, for example, for an automotive vehicle and has a plurality of cylinders each of which is provided with the piston 1, though not shown. The piston 1 has a circular piston head 1a which has a generally annular standard flat surface 2 which is formed along the periphery of the piston head 1a or the piston 1. A part of the piston head 1a inside the annular standard flat surface 2 is protruded upward to form a generally conical protruded section P which has a generally conical or inclined surface 3. The protruded section P is formed with a generally circular cavity 4 of the depression-shape or dish-shape. The cavity 4 has a center axis CC which is offset from a center axis PC of the piston 1 toward an intake valve(s) (not shown). The center axis PC of the cavity 4 is parallel with the center axis PC of the piston 1. The cavity 4 has a generally circular bottom flat surface 4a. The above annular standard flat surface 2 is contained in a standard horizontal plane HP to which the center axis PC is perpendicular.

Figure 2A:
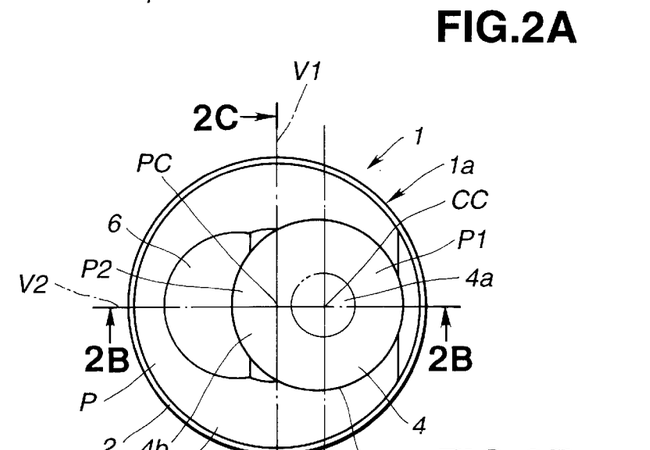
FIG. 2A is a plan view of the piston of FIG. 1.
Figure 2B:
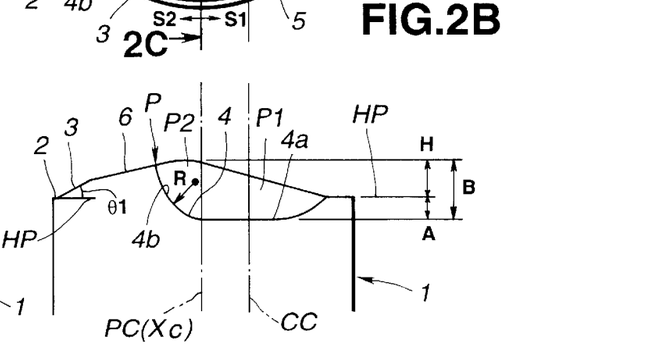
FIG. 2B is a fragmentary sectional view taken in the direction of arrows substantially along the line 2B—2B of FIG. 2A.
Figure 2C:
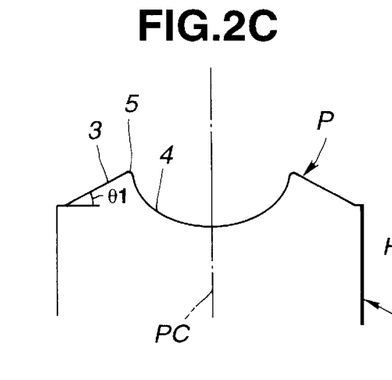
FIG. 2C is a fragmentary sectional view taken in the direction of arrows substantially along the line 2C—2C of FIG. 2A.

Accordingly, a generally annular ridgeline 5 is formed along the periphery of the cavity 4 to surround the cavity 4. Here, it is to be noted that no flat section is formed at a radially outward side of the ridgeline 5. Thus, the inclined surface 3 of the protruded section P continuously slopes down from the ridgeline 5 toward the annular standard flat surface 2. The inclined surface 3 basically forms part of a conical surface. A major part of the annular standard flat surface 2 has a small width ranging from 1.5 to 2.0 mm and is used as a standard surface during production of the piston 1. The protruded section P of the piston 1 is formed with a gentle slope surface 6 which is gentler in slope than the inclined surface 3 as shown in FIG. 2B. This gentle slope surface 6 suppresses the height of the top portion of the protruded section P.

Here, discussion will be made on the locational relationship among the cavity 4, a fuel injector valve 12 and a spark plug 13 with reference to FIG. 3. The cylinder direct injection spark ignition internal combustion engine includes a cylinder head 10 which is fixedly mounted on a cylinder block 15 which is formed with the cylinders C. The piston 1 is slidably movably disposed in each cylinder C. The cylinder head 10 is formed with a depression D forming part of a combustion chamber M formed corresponding to each cylinder C. The fuel injector valve 12 is installed to the cylinder head 10 and has a tip end section (not identified) through which fuel is injected, which tip end section is located radially outward of an intake valve(s) 11 on a horizontal plane containing a bottom flat surface 10a of the cylinder head 10. The bottom flat surface 10a is parallel with the top flat surface or block deck 15a of the cylinder block 15. The fuel injector valve is adapted to directly inject fuel into the combustion chamber M. The fuel injector valve 12 is positioned such that its axis (not shown) is directed into the cavity 4. The spark plug 13 is positioned such that its tip end section (provided with electrodes) is located over a part of an annular peripheral portion (not identified) of the cavity 4. The axis 13a of the spark plug 13 is offset from the center axis Xc of the cylinder C. An exhaust valve(s) 14 is positioned on the opposite side of a vertical plane containing the center axes Xc of the cylinders C with respect to the intake valve(s) 11.

It will be understood that a part of the ridgeline 5 may be cut out thereby to form a valve recess for preventing the protruded section P of the piston 1 from interfering with the intake valve 11 or the exhaust valve 14, in order to meet requirements of valve timing and compression ratio of the engine.

As appreciated from the above, according to the above embodiment, the inclined surface 3 which continuously slopes down toward the periphery of the piston 1 is formed without providing any flat surface outside the ridgeline 5 surrounding the cavity 4 at the piston head 1a. Consequently, stratified charge combustion can be effectively accomplished by virtue of the cavity 4. Besides, gas flow can be effectively ensured between the inside and the outside of the cavity 4 thereby promoting homogenization of air-fuel mixture during homogeneous charge combustion. This provides a high homogeneous charge combustion performance. Additionally, since no flat surface is formed at the protruded section P, the surface area of the piston head 1a is reduced thereby lowering cooling loss, so that a high homogeneous charge combustion performance can be obtained.

Here, the above-mentioned inclined surface 3 forms a surface inclination angle θ1 ranging from 10 to 60° relative to the horizontal plane HP containing the standard flat surface 2 on a vertical plane V2 which contains the center axis PC of the piston 1 and perpendicular to a vertical plane V1 as illustrated in FIG. 2B. The vertical plane V1 passes through the center axes Xc of the cylinders C. The angle θ1 is preferably within a range of from 15 to 45°, and more preferably within a range of from 10 to 30°. The above range of the surface inclination angle θ1 is determined from the graph or data of FIG. 4 which was obtained under experiments conducted on the engine shown in FIGS. 1 to 3. In the experiments, brake torque of the engine during homogeneous charge combustion and fuel consumption during stratified charge combustion were measured upon changing the surface inclination angle θ1 of the inclined surface 3. In FIG. 4, a curve C1 indicates the data of the brake torque of the engine during homogeneous charge combustion, and a curve C2 indicates the data of the fuel consumption of the engine during stratified charge combustion. The graph of FIG. 4 depicts the fact that the brake torque during homogeneous charge combustion and the fuel consumption during stratified charge are compatible with each other within a region indicated by a two-headed arrow which region is selected as the above range of the surface inclination angle θ1. It is to be noted that it is preferable to set the surface inclination angle θ1 as small as possible to obtain the same combustion performance because a piston compression height (or an axial distance between the upper-most portion of the piston and the axis of a piston pin) of the piston 1 increases as the surface inclination angle θ1 increases. Additionally, the surface inclination angle θ1 is set within the above range, taking account of depth and the like of the cavity 4 as discussed below.

Figure 5:
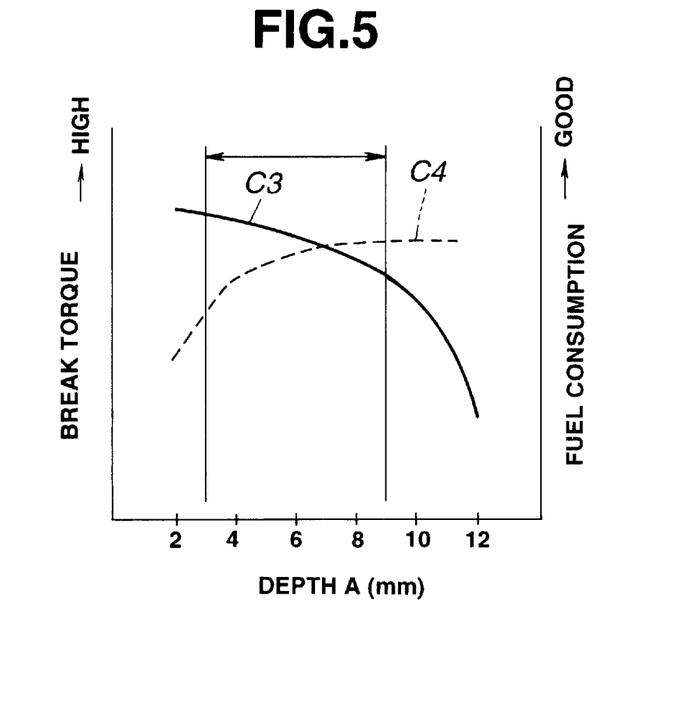
FIG. 5 is a graph showing an optimum range of a depth (A) of a cavity formed in the protruded section of the piston of FIG. 1.

The cavity 4 has a depth A within a range of from 3 to 9 mm. The depth A is an axial distance between the bottom flat surface 4a of the cavity 4 and the standard horizontal plane HP containing the standard flat surface 2 as shown in FIG. 2B. The above range of the depth A is determined from the graph or data of FIG. 5 which was obtained under experiments conducted on the engine shown in FIGS. 1 to 3. In the experiments, brake torque of the engine during homogeneous charge combustion and fuel consumption during stratified charge combustion were measured upon changing the depth A of the cavity 4. In FIG. 5, a curve C3 indicates the data of the brake torque of the engine during homogeneous charge combustion, and a curve C4 indicates the data of the fuel consumption of the engine during stratified charge combustion. The graph of FIG. 5 depicts the fact that the brake torque during homogeneous charge combustion and the fuel consumption during stratified charge are compatible with each other within a region indicated by a two-headed arrow which region is selected as the above range (3 to 9 mm) of the depth A.

In other words, as the depth A of the cavity 4 increases, the characteristics for maintaining fuel inside the cavity 4 is improved so as to facilitate formation of stratified charge (air-fuel mixture) thus improving stratified charge combustion performance; however, homogeneous charge (air-fuel mixture) becomes difficult to be formed in the whole combustion chamber owing to discontinuity between spaces inside and outside the cavity 4. Consequently, the depth A is selected within the range in which formation of stratified charge and formation of homogeneous charge are compatible with each other.

By virtue of the depth A of the cavity 4 within the above range, unevenness of the piston head 1a is suppressed at the irreducible minimum of a demand thereby obtaining the following effects during homogeneous charge combustion: (a) Fuel can be prevented from staying inside the cavity. (b) Gas flow inside the cylinder can be prevented from being weakened. (c) Degradation of combustion due to discontinuity between the inside and outside of the cavity can be prevented. (d) Cooling loss can be lowered owing to reduction in surface area of the piston. It is a matter of course that a high stratified charge combustion performance can be maintained under the effect of the cavity.

Figure 6:
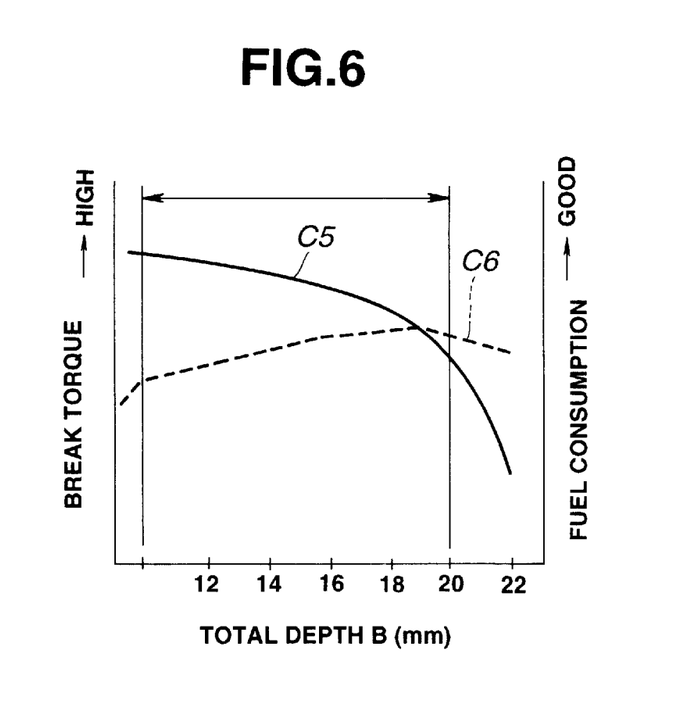
FIG. 6 is a graph showing an optimum range of a total depth (B) of the cavity formed in the protruded section of the piston of FIG. 1.

A total depth (B=A+H) or sum of the depth A of the cavity 4 and a height H of the protruded section P is set within a range of from 10 to 20 mm. The height H of the protruded section P is an axial distance between the upper-most portion of the ridgeline 5 and the standard horizontal plane HP containing the standard flat surface 2. The above range of the total depth B is determined from the graph or data of FIG. 6 which was obtained under experiments conducted on the engine shown in FIGS. 1 to 3. In the experiments, brake torque of the engine during homogeneous charge combustion and fuel consumption during stratified charge combustion were measured upon changing the total depth B. In FIG. 6, a curve C5 indicates the data of the brake torque of the engine during homogeneous charge combustion, and a curve C6 indicates the data of the fuel consumption of the engine during stratified charge combustion. The graph of FIG. 5 depicts the fact that the brake torque during homogeneous charge combustion and the fuel consumption during stratified charge are compatible with each other within a region indicated by a two-headed arrow which region is selected as the above range (10 to 20 mm) of the total depth B.

In other words, as the total depth B increases, the characteristics for maintaining fuel inside the cavity 4 is improved so as to facilitate formation of stratified charge (air-fuel mixture) thus improving stratified charge combustion performance; however, homogeneous charge (air-fuel mixture) becomes difficult to be formed in the whole combustion chamber owing to discontinuity between spaces inside and outside the cavity 4. Consequently, the total depth B is selected within the range (10 to 20 mm) in which formation of stratified charge and formation of homogeneous charge are compatible with each other.

By virtue of the total depth B within the above range, the unevenness of the piston head 1a is suppressed at the irreducible minimum of a demand thereby obtaining the above effects during homogeneous charge combustion. Additionally, the piston compression height is minimized thereby accomplishing weight-lightening of the piston and improving engine noise performance due to piston slap.

A ratio (H/A) of the height H to the depth A is set within a range of from 1.0 to 2.0. Within this range, the brake torque during homogeneous charge combustion and the fuel consumption during stratified charge combustion are compatible with each other, as seen from the graphs of FIGS. 5 and 6.

Figure 7:
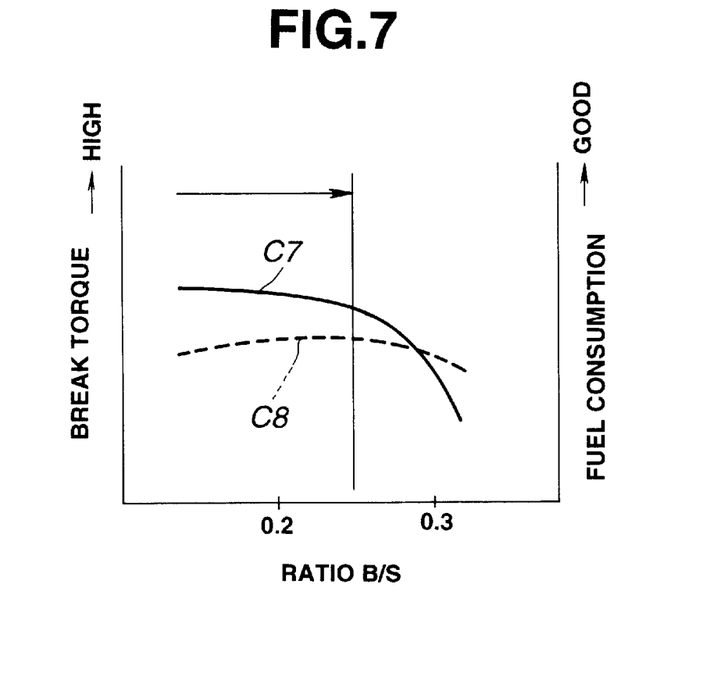
FIG. 7 is a graph showing an optimum range of a ratio (B/S) of the total depth (B) to a piston stroke (S) in connection with the piston of FIG. 1.

A ratio (B/S) of the total depth B to a piston stroke S is set within a range of not higher than 0.25. The piston stroke S is the length of piston travel of each piston as shown in FIG. 3. The above range of the ratio (B/S) is determined from the graph or data of FIG. 7 which was obtained under experiments conducted on the engine shown in FIGS. 1 to 3. In the experiments, brake torque of the engine during homogeneous charge combustion and fuel consumption during stratified charge combustion were measured upon changing the ratio (B/S). In FIG. 7, a curve C7 indicates the data of the brake torque of the engine during homogeneous charge combustion, and a curve C8 indicates the data of the fuel consumption of the engine during stratified charge combustion. The graph of FIG. 7 depicts the fact that the brake torque during homogeneous charge combustion and the fuel consumption during stratified charge are compatible with each other within a region indicated by a headed arrow which region is selected as the above range (B/S≦0.25) of the ratio (H/A).

In other words, if the total depth B is relatively large in case that the piston stroke S is relatively small, combustion performance of the engine is degraded. In this regard, it is preferable to ensure a good combustion performance by reducing the total depth B in accordance with the piston stroke S.

The cavity 4 in this embodiment is shaped as follows: As shown in FIGS. 2A and 2B, a major part P1 of the cavity 4 is located on a first side S1 of a vertical plane V1 which contains the axes Xc of the cylinders in the cylinder block 15. A minor part P2 of the cavity 4 is located on a second side S1 of the vertical plane V1 which second side S1 is opposite to the first side S1 with respect to the vertical plane V1. It will be understood that the tip end section of the fuel injector valve 12 is positioned on the first side S1 to approach the major part P1 of the cavity 4, while the tip end section of the spark plug 13 is positioned on the second side S2 to approach the minor part P2 of the cavity 4. The minor part P2 is larger in depth than the major part P1 as clearly seen in FIG. 2B. A generally annular side wall surface (no numeral) defining the cavity 4 includes a curved surface 4b which defines the minor part P2 of the cavity 4 and is adjacent and contiguous with the gentle slop surface 6 through the ridgeline 5. The curved surface 4b has a radius of curvature R within a range of from 5 to 20 mm on a vertical plane V2 which contains the axis PC and is perpendicular to the vertical plane V1, as shown in FIG. 2B.

Figure 1:
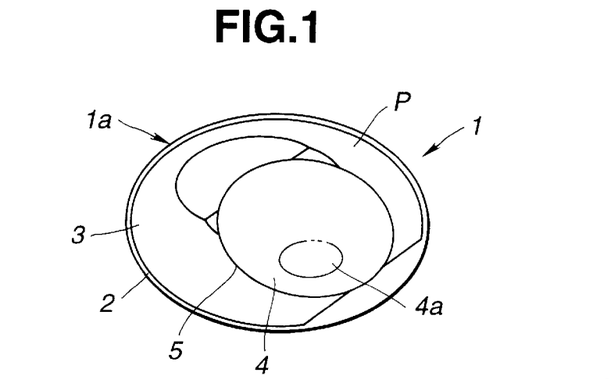
FIG. 1 is a perspective view of a piston head of an embodiment of a piston for a cylinder fuel injection spark ignition internal combustion engine, according to the present invention.
Figure 3:
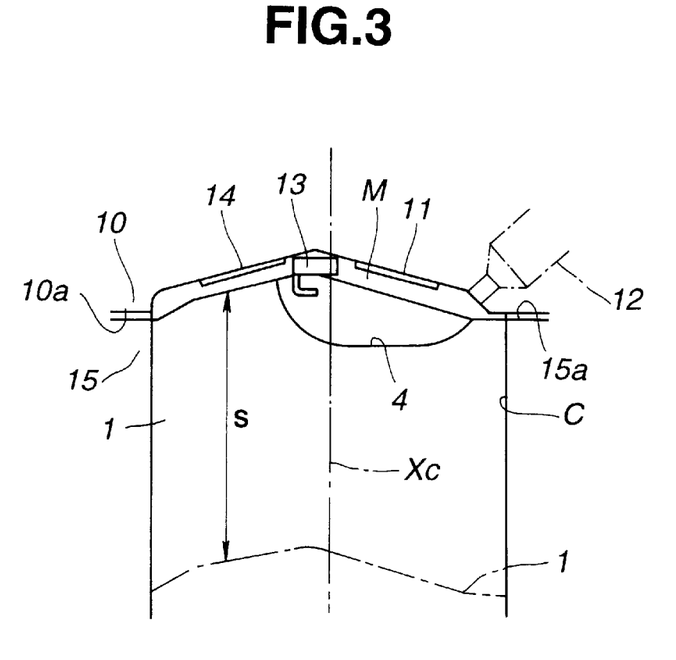
FIG. 3 is a fragmentary sectional view showing the locational relationship between a fuel injector valve and a spark plug in connection with the piston of FIG. 1.
Figure 4:
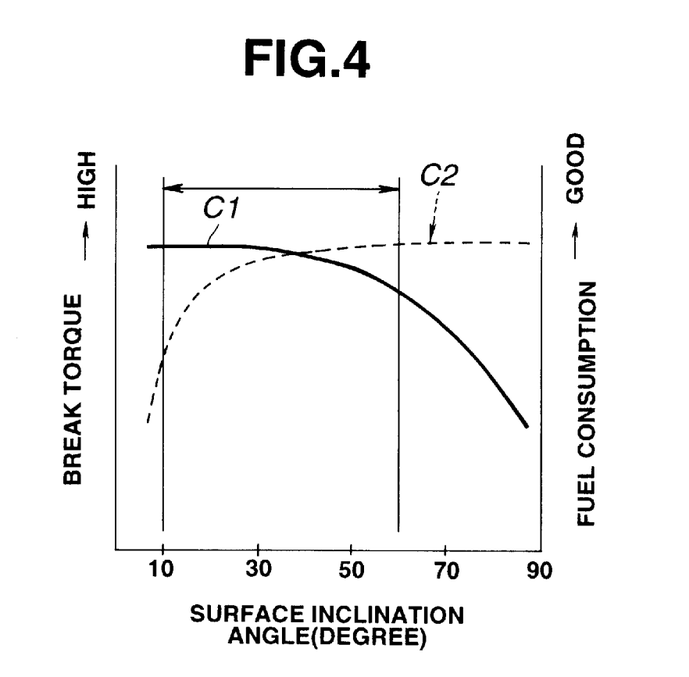
FIG. 4 is a graph showing an optimum range of a surface inclination angle of an inclined surface of the protruded section at the piston head of the piston of FIG. 1.
Figure 8:
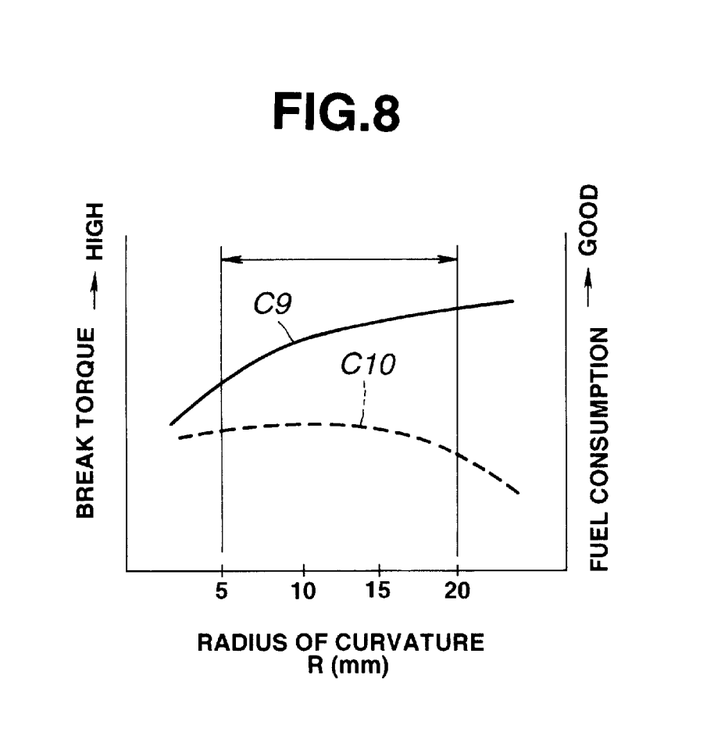
FIG. 8 is a graph showing an optimum range of a radius of curvature (R) of a curved side wall surface of the cavity formed in the protruded section of the piston of FIG. 1.

The above range of radius of curvature R is determined from the graph or data of FIG. 8 which was obtained under experiments conducted on the engine shown in FIGS. 1 to 3. In the experiments, brake torque of the engine during homogeneous charge combustion and fuel consumption during stratified charge combustion were measured upon changing the radius of curvature R of the cavity 4. In FIG. 8, a curve C9 indicates the data of the brake torque of the engine during homogeneous charge combustion, and a curve C10 indicates the data of the fuel consumption of the engine during stratified charge combustion. The graph of FIG. 8 depicts the fact that the brake torque during homogeneous charge combustion and the fuel consumption during stratified charge are compatible with each other within a region indicated by a two-headed arrow which region is selected as the above range (5 to 20 mm) of the radius of curvature R.

By virtue of this radius of curvature R, stratified air-fuel mixture can be smoothly carried to the vicinity of the spark plug 13 during stratified charge combustion, while air-fuel mixture can smoothly flow between the inside and outside of the cavity 4. If the radius of curvature R is smaller than 5 mm, no function of the radius of curvature R can be obtained. If the radius of curvature R exceeds the 20 mm, transportation of stratified air-fuel mixture toward the spark plug 13 cannot be effectively accomplished.

Subsequently, the shape of the cavity 4 of the embodiment will be discussed in detail with reference to FIG. 9 which is an enlarged detail of FIG. 2B and therefore is a cross-sectional view on the vertical plane V2 in FIG. 2A. The curved surface 4b is represented by a curved line segment G1 on the vertical plane V2. The line segment G1 is a part (¼) of a circle having the radius R. The upper end (adjacent the gentle slope surface 6) of the curved line segment G1 is separate from the gentle slope surface 6. A straight line segment G2 extents from the upper end of the curved line segment G1 and reaches the gentle slope surface 6 to form the ridgeline 5. The straight line segment G2 corresponds to a cross-section of an upper wall surface 4c contiguous with the curved surface 4b to define a part of the cavity 4. The straight line segment G2 has a length within a range of from 0 to 10 mm. Otherwise, the curved surface 4b may be configured in connection with the radius of curvature R as shown in FIG. 10, in which the length L of the straight line segment G2 takes a minus value. Accordingly, the length L of the straight line segment G2 is set within a range of from −2 to 10 mm.

Figure 9:
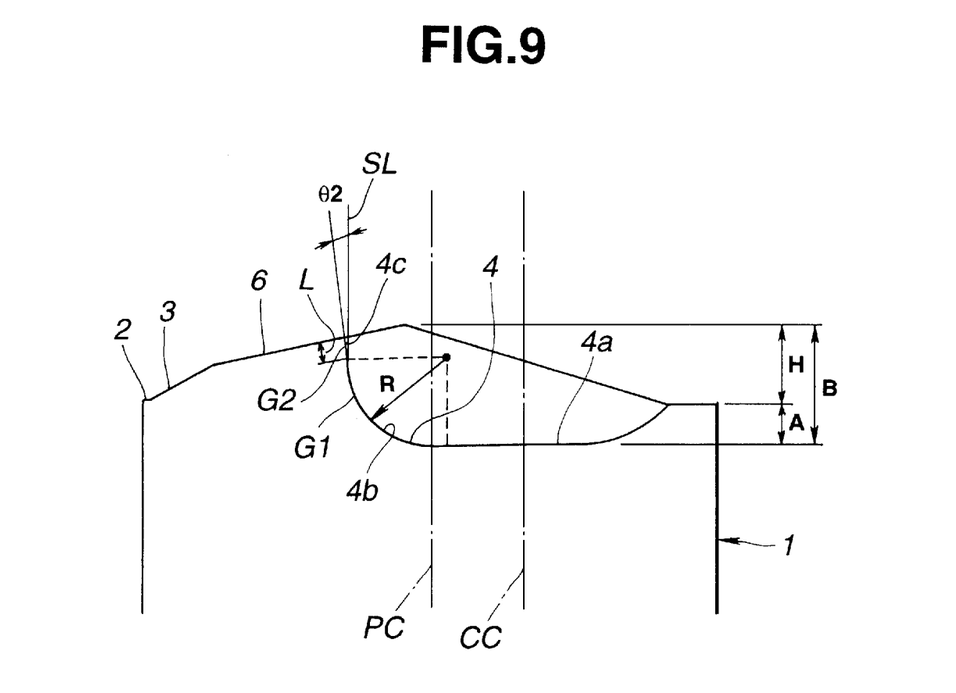
FIG. 9 is a fragmentary enlarged sectional view corresponding to FIG. 2B but illustrating the detailed structure of the piston head.
Figure 10:
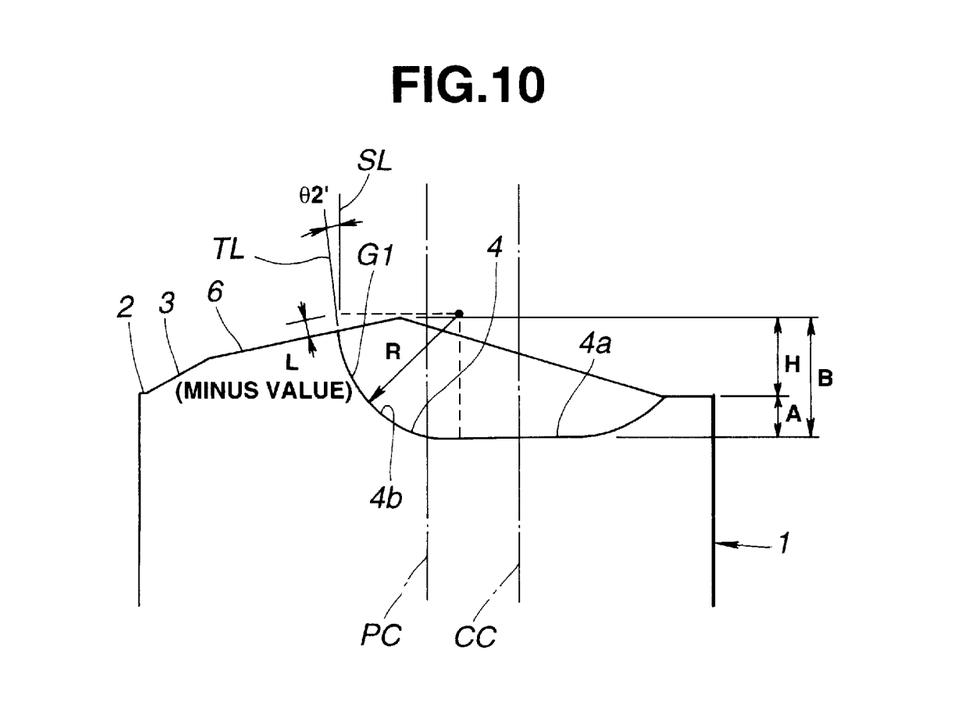
FIG. 10 is a fragmentary enlarged sectional view similar to FIG. 9 but showing a modified example of the piston according to the present invention.
Figure 11:
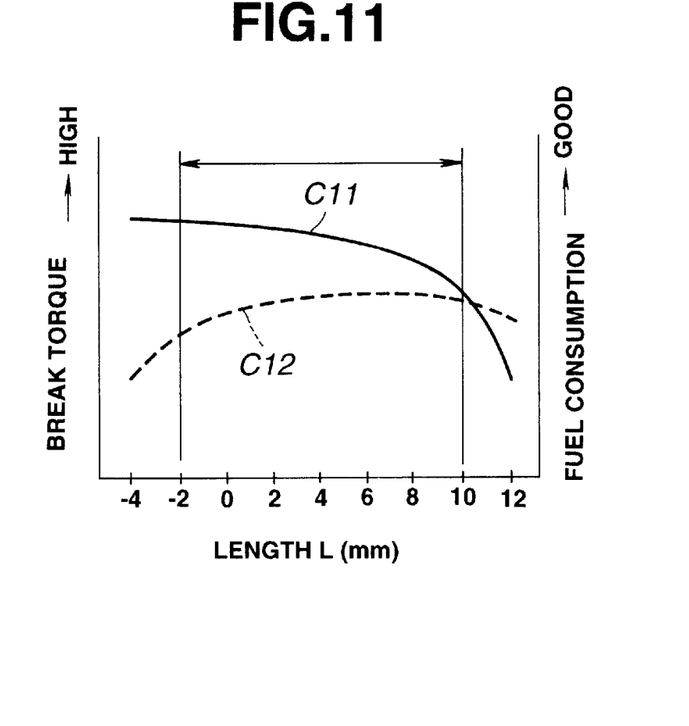
FIG. 11 is a graph showing an optimum range of a length (L) of a straight line segment (G2) corresponding to a wall surface of the cavity formed in the protruded section of the piston in FIG. 9.

This range of the length L is determined from the graph or data of FIG. 11 which was obtained under experiments conducted on the engine shown in FIGS. 1 to 3 and 9 and 10. In the experiments, brake torque of the engine during homogeneous charge combustion and fuel consumption during stratified charge combustion were measured upon changing the length L of the straight line segment G2 corresponding to the wall surface 4c. In FIG. 11, a curve C11 indicates the data of the brake torque of the engine during homogeneous charge combustion, and a curve C12 indicates the data of the fuel consumption of the engine during stratified charge combustion. The graph of FIG. 11 depicts the fact that the brake torque during homogeneous charge combustion and the fuel consumption during stratified charge are compatible with each other within a region indicated by a two-headed arrow which region is selected as the above range (−2 to 10 mm) of the length L of the straight line segment G2 corresponding to the wall surface 4c.

Figure 12:
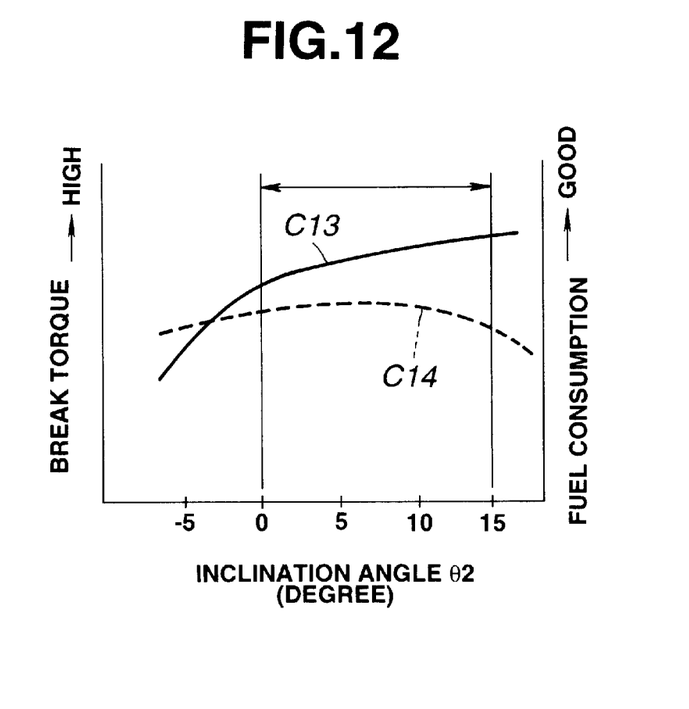
FIG. 12 is a graph showing an optimum range of an inclination angle (θ2) of the straight line segment (G2) in FIG. 11.

Additionally, as shown in FIG. 9, the straight line segment G2 inclines relative to a vertical straight line SL to form an inclination angle θ2. The vertical straight line SL is parallel with the center axis PC of the piston 1 on the vertical plane V2. The straight line segment G2 gradually separates from the center axis PC in a direction toward the gentle flat surface 6. The inclination angle θ2 is within a range of from 0 to 15°. This range of the inclination angle θ2 is determined from the graph or data of FIG. 12 which was obtained under experiments conducted on the engine shown in FIGS. 1 to 3 and 9. In the experiments, brake torque of the engine during homogeneous charge combustion and fuel consumption during stratified charge combustion were measured upon changing the inclination angle 62 of the straight line segment G2. In FIG. 12, a curve C13 indicates the data of the brake torque of the engine during homogeneous charge combustion, and a curve C14 indicates the data of the fuel consumption of the engine during stratified charge combustion. The graph of FIG. 12 depicts the fact that the brake torque during homogeneous charge combustion and the fuel consumption during stratified charge are compatible with each other within a region indicated by a two-headed arrow which region is selected as the above range (0 to 15°) of the inclination angle θ2 of the straight line segment G2. It will be noted that formation of the cavity 4 can be facilitated during production of the piston 1 because the inclination angle θ2 does not take a minus value.

In case of the configuration of FIG. 10 in which the length L of the straight line segment G2 takes a minus value, the upper end of the curved line segment G1 resides at an upper side of the gentle slope surface 6, so that an inclination angle θ2' similar to that θ2 is formed between the vertical straight line SL and a tangent line TL of the curved line segment G1 at a point where the curved line segment G1 crosses the gentle slope surface 6, on the vertical plane V2 shown in FIG. 2. The inclination angle θ2' is set within a range of from 0 to 15°. This range is determined from experimental data which is identical with that of FIG. 12. Consequently, the brake torque during homogeneous charge combustion and the fuel consumption during stratified charge are compatible with each other within the above range (0 to 15°) of the inclination angle θ2' of the tangent line TL of the curved line segment G1. It will be noted that formation of the cavity 4 can be facilitated during production of the piston 1 because the inclination angle θ2' does not take a minus value, also in this case.

Figure 13:
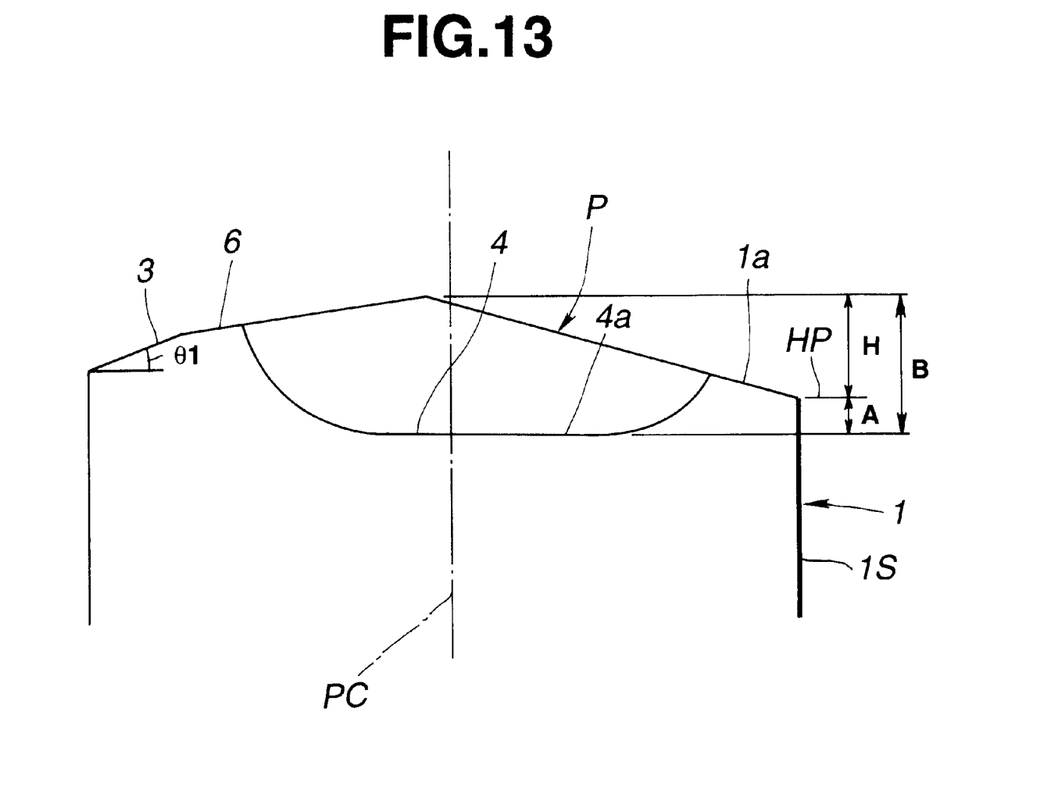
FIG. 13 is a fragmentary enlarged sectional view similar to FIG. 2B but showing another modified example of the piston according to the present invention.
Figure 14:
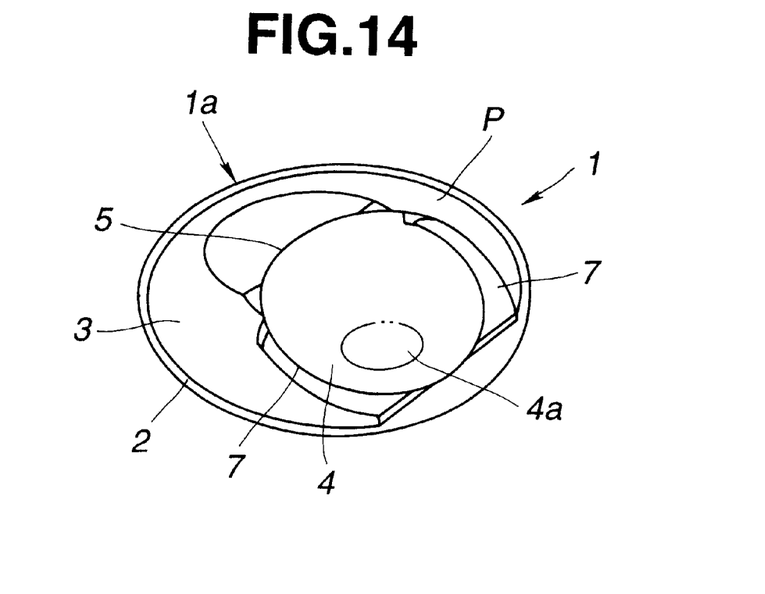
FIG. 14 is a perspective view similar to FIG. 1 but showing a further modified example of the piston according to the present invention.
Figure 15A:
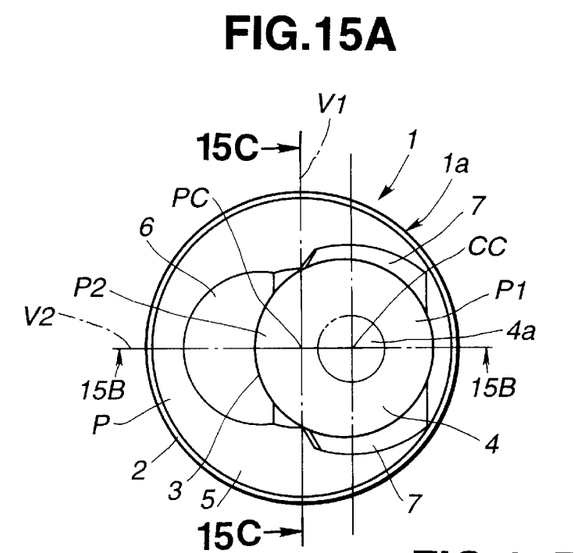
FIG. 15A is a plan view similar to FIG. 2A but showing the piston of FIG. 14.
Figure 15B:
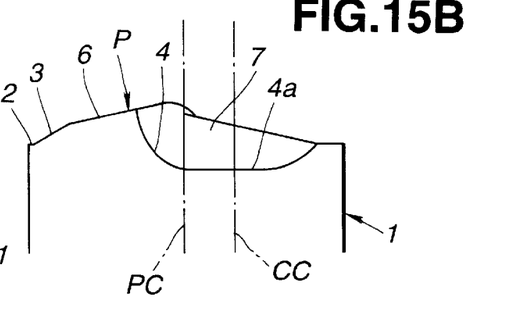
FIG. 15B is a fragmentary sectional view similar to FIG. 2B but showing the piston of FIG. 14.
Figure 15C:
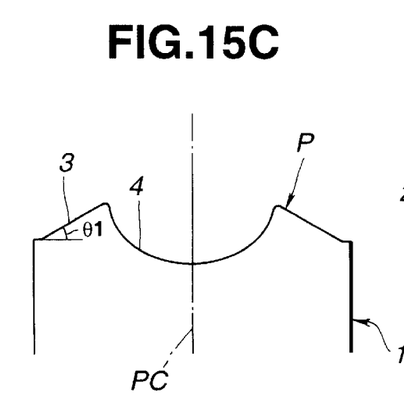
FIG. 15C is a fragmentary sectional view similar to FIG. 2C but showing the piston of FIG. 14.

FIG. 13 illustrates a modified example of the piston 1 similar to the piston shown in FIGS. 1 to 3 with the exception that no annular standard flat surface (2) is formed at the piston head 1a and along the periphery of the piston 1. In this example, the depth A of the cavity 4 and the height H of the protruded section P are measured relative to the standard horizontal plane HP containing a peripheral line at which the surface of the protruded section P and the surface of a cylindrical side wall surface 1s are connected with each other. The horizontal plane HP' is perpendicular to the center axis PC of the piston 1. It will be appreciated that the same effects as those in the embodiment of FIGS. 1 to 3 can be obtained in this modified example.

FIGS. 14 and 15A to 15C illustrate another modified example which is similar to the embodiment shown in FIGS. 1 to 3 with the exception that the protruded section P is formed with valve recesses 7, 7. The valve recesses 7, 7 are formed to prevent intake valves 11, 11 from interfering with the protruded section P of the piston 1. Each valve recess 7 is formed by cutting out a part of the ridgeline 5. It will be understood that two intake valves 11, 11 are provided for each cylinder of the engine in this case.

The thus formed valve recesses 7, 7 not only can meet requirements of valve timing and/or compression ratio as general effects of valve recesses but also can minimize the size of the valve recesses to suppress an increase in piston surface area as compared with a conventional case in which valve recesses are formed by cutting out flat portions in a piston head, because the valve recesses 7, 7 are formed by cutting out the parts of the ridgeline 5. Thus, according to this example, change in combustion chamber volume due to the valve recesses can be suppressed at a small value while facilitating compression ratio adjustment of the engine.

Figure 16A:
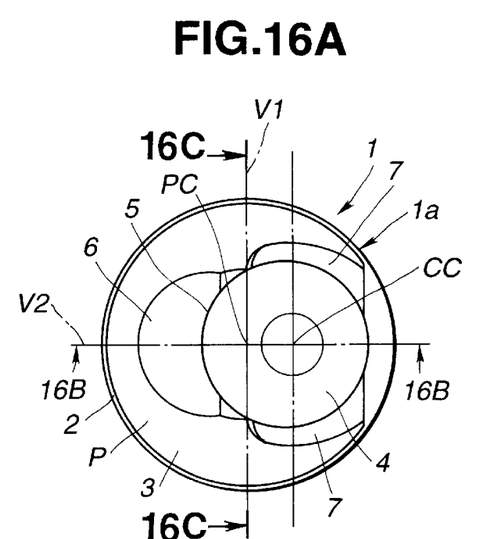
FIGS. 16A, 16B and 16C are views similar respectively to FIGS. 15A, 15B and 15C, for the purpose of explaining an area ratio [(S2/S)×100%] in connection with a combustion chamber defined by the piston of FIG. 14.
Figure 16B:
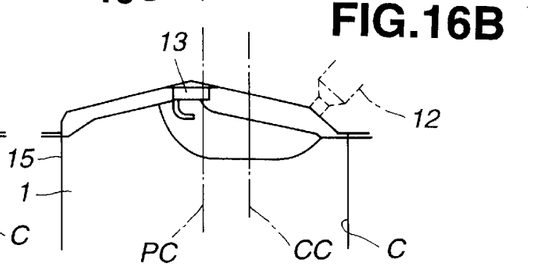
Figure 16C:
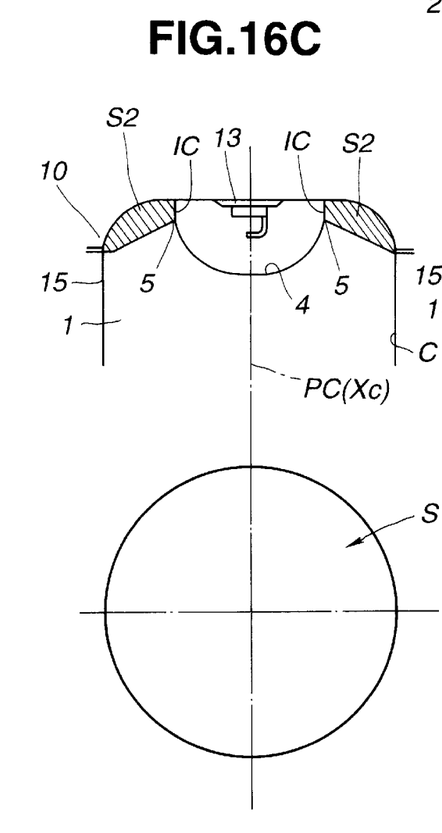

Here, referring to FIGS. 16A to 16C, assume that the cylinder C has a projected area S which is obtained by projecting the circle of the cylinder bore of the cylinder C on a plane of projection which plane corresponding to a horizontal plane perpendicular to the center axis Xc of the cylinder C as shown in FIG. 16C. Additionally, assume that a hatched section in FIG. 16C has an area S2 on the vertical plane V1 passing the center axes Xc of the cylinders C in the cylinder block 15. The hatched section is defined between the surface of the cylinder head 10 and the surface of the piston head 1a of the piston 1 at top dead center and defined at a radially outward side of an imaginary cylinder IC. The imaginary cylinder IC extends from the ridgeline 5 to the surface of the cylinder head 10, and has an axis parallel with the center axis PC of the piston 1. Here, an area ratio [(S2/S)×100%] is within a range of not lower than 30%.

Figure 17:
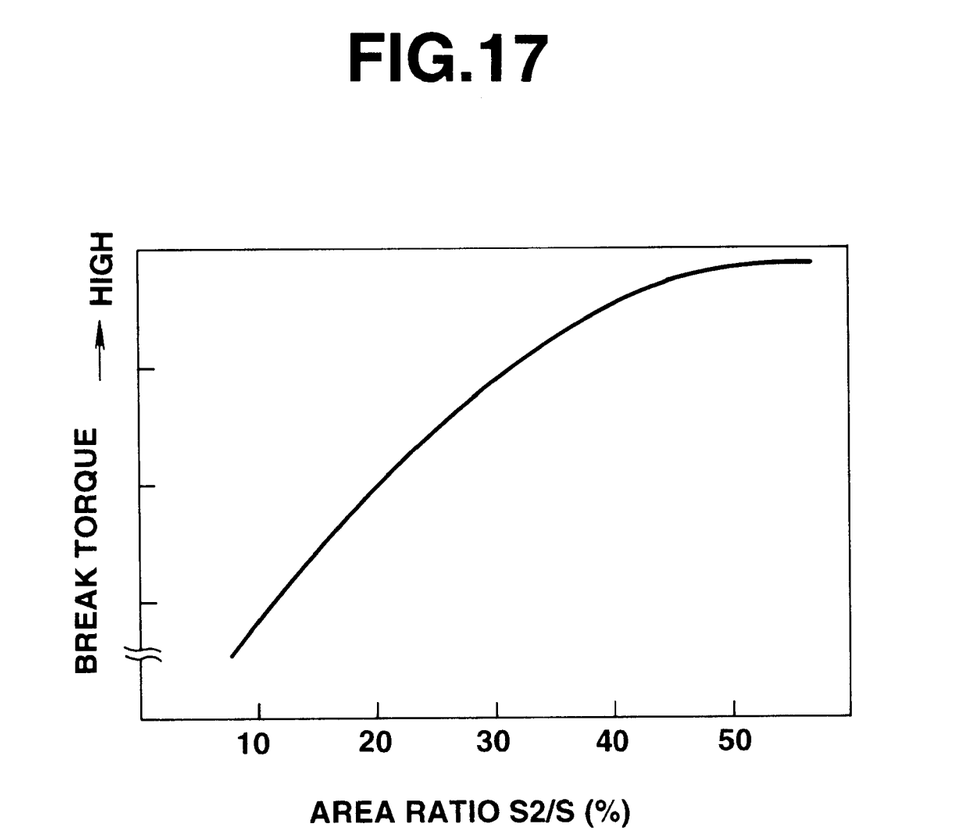
FIG. 17 is a graph showing an optimum range of the area ratio explained in FIGS. 16A, 16B and 16C.

This range of the area ratio is determined from the graph or data of FIG. 17 which was obtained under experiments conducted on the engine shown in FIGS. 14, 15A to 15C and 16A to 16C. In the experiments, brake torque of the engine during homogeneous charge combustion was measured upon changing the area ratio of the engine. In FIG. 17, a curve indicates the data of the brake torque of the engine during homogeneous charge combustion. The graph of FIG. 17 depicts the fact that the brake torque during homogeneous charge combustion increases as the area ratio increases, in which it is preferable that the area ratio is not less than 30% to maintain a high brake torque during homogeneous combustion. The upper limit of this area ratio is determined in accordance with balance between homogeneous charge combustion performance and stratified charge combustion performance, in which homogeneous charge combustion cannot be improved if the area ratio is increased over 50%, so that the upper limit of the area ratio is about 50%.

Although the above area ratio [(S2/S)×100%] has been shown and described in connection with the modified example of the piston according to the present invention, it will be appreciated that the idea of the area ratio may be applicable to engines having the other pistons shown in FIGS. 1 to 3, 9, 10 and 13.

While only the pistons having the circular cavity 4 formed eccentric toward the fuel injector valve 12 has been shown and described, it will be understood that the same effects as those by such pistons can be obtained also by a piston having a generally coaxial circular cavity (4), in which the center axis of the cavity 4 is located to be generally aligned with the center axis of the cylinder of an engine.

What is claimed is:

1. A piston for a cylinder direct injection spark ignition internal combustion engine, comprising:
   a piston head including a protruded section which is protruded from a standard horizontal plane which is perpendicular to a center axis of said piston, said protruded section having a cavity whose periphery forms a generally circular ridgeline, and an inclined surface formed outside said ridgeline and extending toward a periphery of said piston head, said inclined surface continuously sloping down in a direction from said ridgeline to the periphery of said piston, said inclined surface forming an angle (θ1) ranging from 10 to 60° relative to said standard horizontal plane,
   wherein said cavity has a depth (A) within a range of from 3 to 9 mm, said depth being an axial distance between a bottom surface of said cavity and said standard horizontal plane of said piston,
   wherein said cavity is defined by a generally annular side wall surface, said side wall surface being represented by first and second opposite curved line segments on a vertical plane containing a center axis of said piston and a center axis of said cavity, said first curved line segment being located closer to a spark plug than said second curved line segment, said first curved line segment having a radius of curvature, ranging from 5 to 20 mm.

2. A cylinder direct injection spark ignition internal combustion engine, comprising:
   a cylinder block having a plurality of cylinders;
   a cylinder head fixedly mounted on said cylinder block;
   intake and exhaust valves disposed on two sides of said cylinder head, respectively;
   a fuel injector valve for directly injecting fuel into a combustion chamber formed corresponding to each cylinder;
   a spark plug whose tip end section is projected into the combustion chamber;
   a piston movably disposed in the cylinder to define the combustion chamber between it and said cylinder head, said piston including a piston head having a protruded section which is protruded from a standard horizontal plane which is perpendicular to a center axis of said piston, said protruded section having a cavity whose periphery forms a generally circular ridgeline, said cavity having a center axis which is offset from a center axis of said piston toward said intake valve, and a conical inclined surface formed outside said ridgeline and extending toward a periphery of said piston head, said conical inclined surface continuously sloping down in a direction from said ridgeline to the periphery of said piston, said conical inclined surface forming an angle ranging from 10 to 60° relative to said standard horizontal plane,
   wherein said conical inclined surface is formed at least partly on both an exhaust side and an intake side of the piston head.

3. The cylinder direct injection spark ignition spark ignition internal combustion engine according to claim 2, wherein said conical inclined surface extends across a vertical plane that contains the center axis of the piston and is perpendicular to a second vertical plane that contains both the center axis of the piston and the center axis of the cavity.

4. A piston for a cylinder direct injection spark ignition internal combustion engine, comprising:
   a piston head including a protruded section which is protruded from a standard horizontal plane which is perpendicular to a center axis of said piston, said protruded section having a cavity whose periphery forms a generally circular ridgeline, and a conical inclined surface formed outside said ridgeline and extending toward a periphery of said piston head, said conical inclined surface continuously sloping down in a direction from said ridgeline to a periphery of said piston head, said conical inclined surface forming an angle (Ø1) ranging from 10 to 60° relative to said standard horizontal plane,
   wherein said conical inclined surface is formed at least partly on both an exhaust side and an intake side of the piston head.

5. A piston as claimed in claim 4, wherein said protruded section has a gentle slope surface located outside said ridgeline, said gentle slope surface being contiguous with said inclined surface and forms a second angle relative to said standard horizontal plane, said second angle being smaller than said first angle.

6. A piston as claimed in claim 4, wherein a percentage of a cross-sectional area of a part of a combustion chamber to a projected area of cylinder bore of a cylinder of the engine is not less than 30%, said cross-sectional area being on a vertical plane containing center axes of cylinders of the engine, said part of said combustion chamber being defined between a surface of a cylinder head and said piston head of said piston at top dead center and defined by an imaginary cylinder connecting said ridgeline and the surface of said cylinder head, said imaginary cylinder having an axis parallel with the center axis of said piston, said projected area being obtained by projecting the cylinder bore in a direction of the center axis of said cylinder.

7. A piston as claimed in claim 4, wherein said piston head has a generally annular standard flat surface formed along the periphery of said piston head and lying on said standard horizontal plane, wherein said protruded section being surrounded by said standard flat surface.

8. A piston as claimed in claim 4, wherein said piston head is contiguous with a cylindrical side wall of said piston through said standard horizontal plane.

9. A piston as claimed in claim 4, wherein said angle (θ1) is within a range of from 10 to 30°.

10. The piston according to claim 4, wherein said cavity has a center axis which is offset from the center axis of the piston, and wherein said conical inclined surface extends across a vertical plane that contains the center axis of the piston and is perpendicular to a second vertical plane that contains both the center axis of the piston and the center axis of the cavity.

11. A piston as claimed in claim 4, wherein said cavity has a depth (A) within a range of from 3 to 9 mm, said depth being an axial distance between a bottom surface of said cavity and said standard horizontal plane of said piston.

12. A piston as claimed in claim 11, wherein a total value (B) of said depth (A) and a height (H) of said protruded section is within a range of from 10 to 20 mm, said height of said protruded section being an axial distance between said standard horizontal plane and an upper-most portion of said ridgeline.

13. A piston as claimed in claim 12, wherein a ratio (H/A) of said height (H) to said depth (A) is within a range of from 1.0 to 2.0.

14. A piston as claimed in claim 12, wherein a ratio (B/S) of a total value (B) to a piston stroke (S) is within a range of not larger than 0.25, said total value being a total of a depth (A) of said cavity and a height (H) of said protruded section, said depth being an axial distance between a bottom surface of said cavity and said standard horizontal plane of said piston, said height of said protruded section being an axial distance between said standard horizontal plane and an upper-most portion of said ridgeline.

15. A piston as claimed in claim 1, wherein said cavity is defined by a generally annular side wall surface, said side wall surface being represented by first and second opposite curved line segments on a vertical plane containing a center axis of said piston and a center axis of said cavity, said first curved line segment being located closer to a spark plug than said second curved line segment, said first curved line segment having a radius of curvature, ranging from 5 to 20 mm.

16. A piston as claimed in claim 15, wherein said first curved line segment has an end which reaches a surface of said protruded section on said vertical plane, a tangent line of said first curved line segment at the surface of said protruded section inclining relative to the center axis of said piston to form an angle ($\theta 2'$) ranging from 0 to 15° on said vertical plane, said tangent line inclining away from the center axis of said piston in a direction toward the surface of said protruded section.

17. A piston as claimed in claim 15, wherein said first curved line segment has an end which is adjacent and separate from a surface of said protruded section, wherein said cavity is defined by an upper wall surface contiguous with said side wall surface, said upper wall surface being represented as a straight line segment on said vertical plane, said straight line segment residing between and connecting the end of said curved line segment and the surface of said protruded section on said vertical plane, said straight line segment having a length (L) ranging from 0 to 10 mm.

18. A piston as claimed in claim 17, wherein said straight line segment inclines relative to the center axis of said piston to form an angle ($\theta 2$) ranging from 0 to 15° on said vertical plane, said straight line segment inclining away from the center axis of said piston in a direction toward the surface of said protruded section.

* * * * *